United States Patent Office

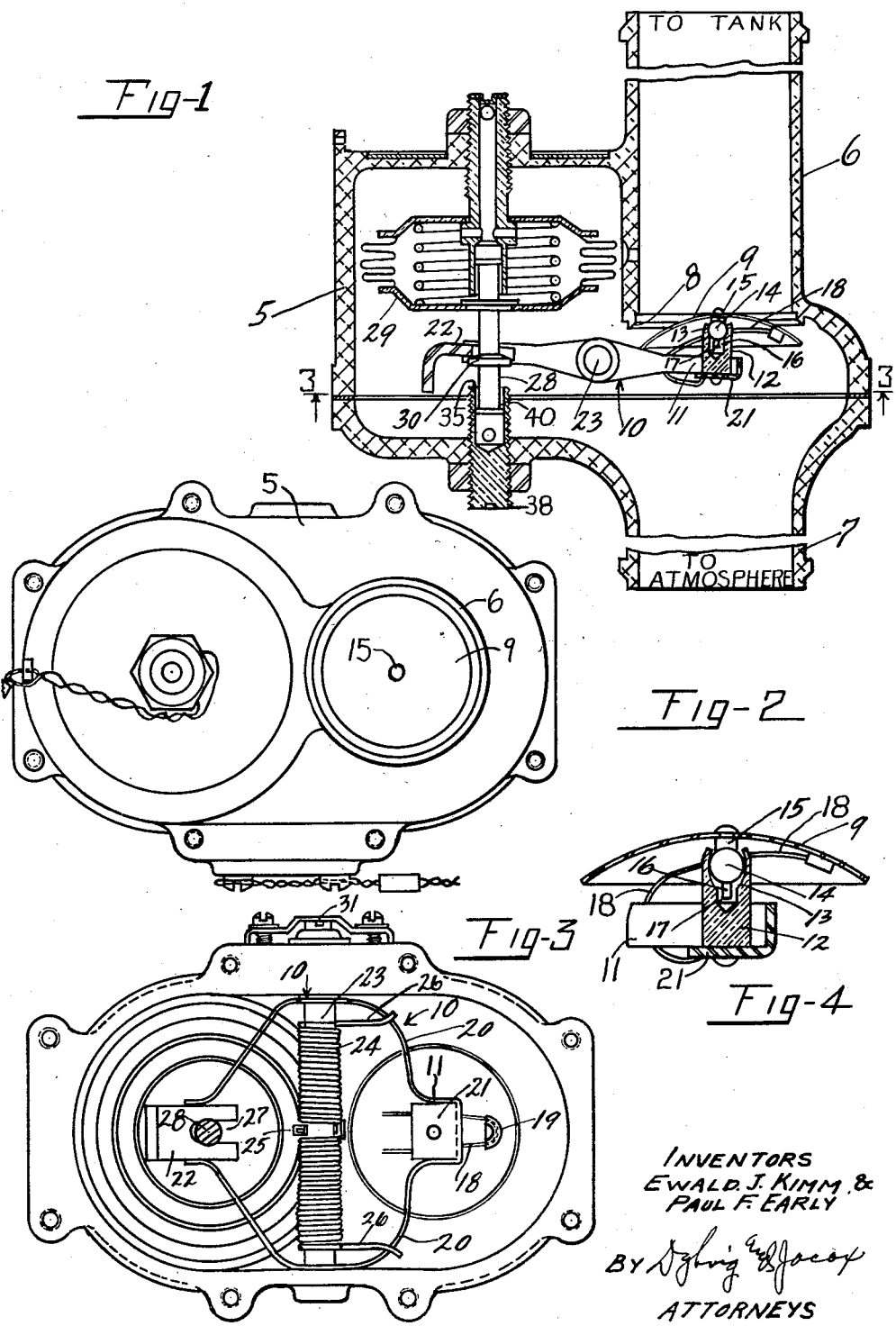
June 9, 1959    E. J. KIMM ET AL    2,889,845
VENT VALVE MECHANISM
Filed June 27, 1955
INVENTORS
EWALD J. KIMM &
PAUL F. EARLY
ATTORNEYS

2,889,845
Patented June 9, 1959

2,889,845

VENT VALVE MECHANISM

Ewald J. Kimm and Paul F. Early, Dayton, Ohio, assignors to Standard-Thomson Corporation, Vandalia, Ohio, a corporation of Delaware Application June 27, 1955, Serial No. 518,242

1 Claim. (Cl. 137—80)

This invention relates to a vent valve mechanism. The invention relates particularly to a valve mechanism for use in opening and closing a liquid container. It relates more particularly to a valve mechanism for opening and closing a container to the atmosphere. The invention relates still more particularly to a vent valve for a crank case, oil tanks, and the like which are associated with aircraft engines. However, the invention is not so limited in that it may be applied to other types of equipment and to other uses.

This application is a continuation-in-part of our copending application for Vent Valve Mechanism, Serial No. 203,170, filed on or about December 28, 1950, now Patent No. 2,720,212.

Many valves and other devices used in aircraft are short-lived due to the fact that they are subjected to high vibrational and gravitational forces.

An object of this invention is to provide a valve mechanism which is long-lived due to the fact that the elements thereof are substantially free from flutter or vacillation even when the valve is subjected to high vibrational or gravitational forces.

Another object of this invention is to provide a valve mechanism which may be controlled by a thermal responsive and/or a pressure responsive device, or by any other suitable means.

Another object of this invention is to provide a vent valve mechanism which is automatically controlled.

Another object of this invention is to provide a vent valve mechanism which is positive in operation, simple in construction and which can be produced at relatively low costs.

Other objects and advantages reside in the construction of parts, the combination thereof and the mode of operation, as will become more apparent from the following description.

In the drawing:

Figure 1 is a sectional view taken centrally through a vent valve mechanism of this invention.

Figure 2 is a top plan view of the assembly of this invention.

Figure 3 is a sectional view taken substantially on the line 3—3 of Figure 1.

Figure 4 is an enlarged sectional view of the ball and socket connection between the movable valve member and the support thereof.

Referring to the drawing in detail, the vent valve mechanism of this invention comprises a casing 5 having aligned tubular portions 6 and 7. The tubular portion 6 is adapted to be attached to an opening leading to a crank case or other liquid container. The tubular portion 7 is adapted to lead to the atmosphere.

A movable valve member 9 is engageable with a valve seat 8 to close the tubular portion 6. This valve member 9 is so supported and controlled that when it is in its open position, spaced from the valve seat 8, it will be tilted about an axis transverse to the line of its movement toward and away from the valve seat 8. Thus, one edge portion of the valve member 9 will be spaced from the valve seat 8 a distance less than the distance of the opposite edge portion of the valve member 9. Consequently, when the valve member 9, in its tilted position, is moved toward the valve seat 8, the first mentioned edge portion thereof will engage the valve seat 8 in advance of the other edge portion. The movement of the edge portion which first engaged the valve seat is thus interrupted, and the further movement of the valve member in valve closing direction causes the other edge portions thereof to progressively engage the valve seat, thereby causing the valve member to be firmly seated and retained in a seated position without flutter or chatter.

The movable valve member 9 may be of any suitable construction and may be supported in any suitable manner. However, herein, the valve member 9 is shown as being concavo-convex in form; that is, it conforms to a section of a sphere. The supporting means for the valve member 9 is shown as a lever 10 pivotally mounted intermediate its ends on an axis transverse to the flow passage and preferably at one side thereof. An end 11 of the lever 10 extends into line with the valve seat 8 and is provided with means for supporting the movable valve member 9 thereon.

A bearing block 12 is rigidly secured to the end 11 of the lever 10. The bearing block 12 is substantially in line with the center of the tubular portion 6, and the upper portion of the bearing block 12 is provided with a spherical socket 13 in which is mounted a bearing ball 14 which is rigidly secured to the concave side of the movable valve member 9, preferably at the center thereof. The bearing ball 14 is provided with a lug 15 which extends through the movable valve member 9, being firmly secured thereto. The attachment of the lug 15 to the movable valve member 9 is sealed against fluid leakage through the valve member 9. The ball 14, at the portion thereof diametrically opposite the lug 15, is provided with a protuberance 16 which extends into a recess 17 of the bearing block 12. Thus, the protuberance 16 limits the pivotal movement of the valve member 9.

Tilting movement may be imparted to the valve member 9 in any suitable manner, but, preferably, spring means is employed for thus purpose. As shown, a U-shaped spring 18 has its transverse portion rigidly secured to the valve member 9 adjacent one edge portion thereof, as indicated by reference numeral 19. The two legs of the U-shaped spring 18 extend inwardly on opposite sides of the bearing block 12. The two legs of the spring 18 also extend downwardly and outwardly and are rigidly secured to the end 11 of the lever 10 and thus tend to tilt the valve member 9 about the pivotal point thereof, as established by the ball 14 and as clearly shown in Figures 1 and 4. It is to be noted that the bearing block 12 extends into the concave side of the valve member 9 and the bearing ball 14, which is the pivotal axis of the connection between the bearing block 12 and the valve member 9, is adjacent the concave side of the valve member 9.

The lever 10 comprises two curved members or arms 20 which are rigidly connected one to the other at their respective ends by means of plates 21 and 22, as shown in Figure 3. The plate 21 constitutes the support for the bearing block 12. The portions of the two arms 20 intermediate the ends thereof are in spaced relation one from the other and are pivotally mounted on a shaft 23 attached to the side walls of the casing 5.

A helical spring or torsion spring 24 is coiled about the shaft 23. The central portion of the spring 24 is rigidly secured to the shaft 23 as indicated by reference numeral 25. The spring 24 is provided with two end portions 26 which extend beneath the arms 20 and engage each of the arms 20 intermediate the central portion thereof and one end thereof, as clearly shown in Figure 3. The spring 24 is wound in such a direction that it tends to move the end 11 of the lever 10 toward the tubular portion 6. Thus, the spring 24 tends to move the valve member 9 toward engagement with the valve seat 8, closing the fluid passage through the tubular portion 6.

The plate 22 constitutes a counterweight at the end of the arms 20 opposite the plate 21. The weight of the plate 22 counterbalances the weight of the plate 21 and the elements attached to the plate 21. The plate 22 is of such a shape, and is so positioned at the end of the lever 10 opposite the valve member 9, that the center of gravity of the lever 10, with all of the elements attached thereto, is precisely at the pivotal axis of the lever 10. In other words, the center of gravity of the lever assembly is precisely at the pivotal axis thereof.

Therefore, the assembly of the lever 10, with all of the elements attached thereto, is in static balance at all times, regardless of the pivotal position of the lever 10. Hence, the lever assembly does not shake or vibrate or oscillate with respect to the casing 5, even though the casing 5 is subjected to various vibrational and/or gravitational forces. Even though the vent valve mechanism of this invention is subjected to such gravitational and/or vibrational forces as experienced by apparatus attached to an aircraft, the movable valve member 9 does not vibrate or oscillate. Static balance of the lever assembly causes the lever assembly to maintain any adjusted pivotal position at which it is disposed. Whether the valve member 9 is in a closed position or in an open position, the valve member 9 does not flutter or vibrate but remains precisely in its adjusted position.

As stated above, the helical spring 24 tends to cause rotation of the lever 10 in a counterclockwise direction as viewed in Figure 1. Thus, the helical spring 24 tends to cause closing movement of the valve member 9. Due to the fact that the torsion spring or helical spring 24 encircles the shaft 23, the spring 24 provides a force upon the lever assembly without changing the static balance thereof. In any rotative position of the lever assembly the static balance thereof is not disturbed by the force of the spring 24 upon the lever assembly.

Pivotal movement of the lever 10 by means of the spring 24 may be controlled by any suitable means. Herein, the means of control is shown as a bellows 29. The bellows 29 is adapted to expand and contract with variations in temperature and/or pressure. The tubular portion 7, being open to the atmosphere, exposes the bellows 29 to variations in temperature and pressure of the atmosphere.

A rod 28 is attached to the bellows 29 and slidably extends through a slot 27 in the plate 22. A collar 30 is attached to the rod 28 beneath the plate 22. As the lever 10 is pivotally urged by the spring 24, the lever 10 engages the collar 30. The collar 30 thus normally determines the pivotal position of the lever 10. However, when the bellows 29 permits rotative movement of the lever 10 so that the valve member 9 engages the valve seat 8, the collar 30 engages an abutment end 35 of a stop screw 38. The stop screw 38 extends into the casing 5 and is threadedly attached thereto, as shown in Figure 1. The stop screw 38 has a cavity 40 therein at the end thereof which extends into the casing 5. The rod 28 has the lower end thereof slidably movable within the cavity 40 of the stop screw 38.

When the bellows 29 expands to such an extent that the collar 30 attached to the rod 28 engages the abutment end 35 of the stop screw 38 the bellows 29 is prevented from further expansion. As stated above, the stop screw 38 is so adjusted that as the collar 30 engages the abutment surface 35, the movable valve member 9 engages the valve seat 8, closing the fluid port therethrough. With the collar 30 so positioned in engagement with the abutment surface 35, the lever assembly with the movable valve member 9 operates as a pressure relief mechanism; if internal pressure within the tank connected by the tubular portion 6 becomes excessive, the fluid pressure within the tank urges the valve member 9 to move from engagement with the valve seat 8. The lever 10 thus rotatively moves in a counterclockwise direction as viewed in Figure 1 even through the collar 30 remains in engagement with the abutment surface 35.

From the foregoing description, it is understood that operation of the balanced pivotal lever assembly of this invention may be governed by any suitable type of control means. Furthermore, the balanced lever assembly of this invention may be used without a control means due to the fact that the lever assembly, including the movable valve 9, may be applied to a fluid container as a pressure or vacuum relief means.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described our invention, we claim:

A valve mechanism of the type provided with a structure having a flow passage therethrough and a valve seat at one end of the flow passage, the combination comprising a lever assembly, the lever assembly including a lever having an end movable toward and away from said valve seat, a valve closure member attached to the lever adjacent said end thereof engageable with the valve seat to close the flow passage, weight means attached to the lever adjacent the other end thereof, and support means carried by the structure pivotally supporting the lever assembly at the center of gravity thereof, the position of attachment of the valve closure member to the lever and the position of attachment of the weight means to the lever and the support means of the lever being in substantially the same plane.

References Cited in the file of this patent

UNITED STATES PATENTS

| | | |
|---|---|---|
| 827,823 | Starr | Aug. 7, 1906 |
| 1,204,316 | Renner | Nov. 7, 1916 |
| 1,324,515 | Otti | Dec. 9, 1919 |
| 2,169,321 | Jones | Aug. 15, 1939 |
| 2,506,694 | Watson | May 9, 1950 |
| 2,694,358 | Taylor | Nov. 16, 1954 |
| 2,720,212 | Kimm | Oct. 11, 1955 |

FOREIGN PATENTS

| | | |
|---|---|---|
| 936,419 | France | of 1948 |